(12) United States Patent
Embler et al.

(10) Patent No.: US 11,939,086 B2
(45) Date of Patent: Mar. 26, 2024

(54) FUEL TANKS AND REUSABLE LAUNCH VEHICLES COMPRISING THESE FUEL TANKS

(71) Applicant: The Boeing Company, Chicago, IL (US)

(72) Inventors: Jonathan David Embler, Santa Ana, CA (US); Tin Anh Luu, Garden Grove, CA (US); Morgan Ashley Lewis, Huntington Beach, CA (US); John Matthew Nichols, Madison, AL (US); Keith Charles Kreutztrager, St. Charles, MO (US); Chinh Manh Cao, Huntington Beach, CA (US); Jonathan Edward Toomey, Orange, CA (US); Martin Edward Lozano, Huntington Beach, CA (US); Alfredo Lopez, Long Beach, CA (US)

(73) Assignee: The Boeing Company, Chicago, IL (US)

(*) Notice: Subject to any disclaimer, the term of this patent is extended or adjusted under 35 U.S.C. 154(b) by 251 days.

(21) Appl. No.: 17/405,505

(22) Filed: Aug. 18, 2021

(65) Prior Publication Data
US 2022/0258874 A1    Aug. 18, 2022

Related U.S. Application Data

(60) Provisional application No. 63/150,320, filed on Feb. 17, 2021.

(51) Int. Cl.
*B64G 1/40* (2006.01)
*B64G 1/00* (2006.01)

(52) U.S. Cl.
CPC .............. *B64G 1/402* (2013.01); *B64G 1/002* (2013.01)

(58) Field of Classification Search
CPC ...... B65D 88/12; B65D 88/22; B65D 47/043; B65D 90/52; B65D 88/748; B65D 88/128;
(Continued)

(56) References Cited

U.S. PATENT DOCUMENTS 4,715,399 A    12/1987   Jaekle, Jr. et al.
4,733,531 A *   3/1988   Grove ...................... F02K 9/44
                                                    137/154
(Continued)

FOREIGN PATENT DOCUMENTS

JP    H03224896 A    10/1991

OTHER PUBLICATIONS

Extended European Search Report, Application No. 22156645.8, dated Sep. 15, 2022, 7 pages.

*Primary Examiner* — Kareen K Thomas
(74) *Attorney, Agent, or Firm* — Kwan & Olynick LLP

(57) ABSTRACT

A fuel tank comprises an interior wall, a sump, and a baffle that comprises a center fitting, a full-length containment petal, a partial-length containment petal, a dump tube. The full-length containment petal comprises a full-length side edge, extending radially outward from the center fitting. The partial-length containment petal comprises a partial-length side edge, extending radially outward from the center fitting. The dump tube is connected to the sump. The full-length side edge of the full-length containment petal is longer than the partial-length side edge of the partial-length containment petal. All of the partial-length side edge of the partial-length containment petal is attached to a linear portion of the full-length side edge of the full-length containment petal.

20 Claims, 9 Drawing Sheets

(58) Field of Classification Search
CPC ........ B65D 90/34; B65D 81/18; B64G 1/402;
B64G 1/002; B64G 1/14; B64D 37/08;
B64D 37/26; B60K 15/03
See application file for complete search history.

(56) References Cited

U.S. PATENT DOCUMENTS

| | | | |
|---|---|---|---|
| 4,768,541 A * | 9/1988 | Uney | B64G 1/402 |
| | | | 137/154 |
| 5,279,323 A | 1/1994 | Grove et al. | |
| 5,518,140 A * | 5/1996 | Lenz | F17C 9/00 |
| | | | 220/585 |
| 6,220,287 B1 * | 4/2001 | Wolf | B64G 1/402 |
| | | | 137/574 |
| 6,571,624 B1 | 6/2003 | Grayson et al. | |
| 8,043,396 B2 * | 10/2011 | Pessana | F17C 13/088 |
| | | | 96/155 |
| 9,643,741 B2 * | 5/2017 | Hu | B64G 1/402 |
| 9,970,389 B2 * | 5/2018 | Lopez | B64G 1/402 |
| 10,065,751 B2 * | 9/2018 | Kawahara | F17C 13/008 |
| 2003/0056838 A1 | 3/2003 | Grayson | |
| 2017/0122170 A1 * | 5/2017 | Fahrenkrug | B01D 35/0276 |
| 2021/0010406 A1 * | 1/2021 | Swaroop | B01D 29/15 |

\* cited by examiner

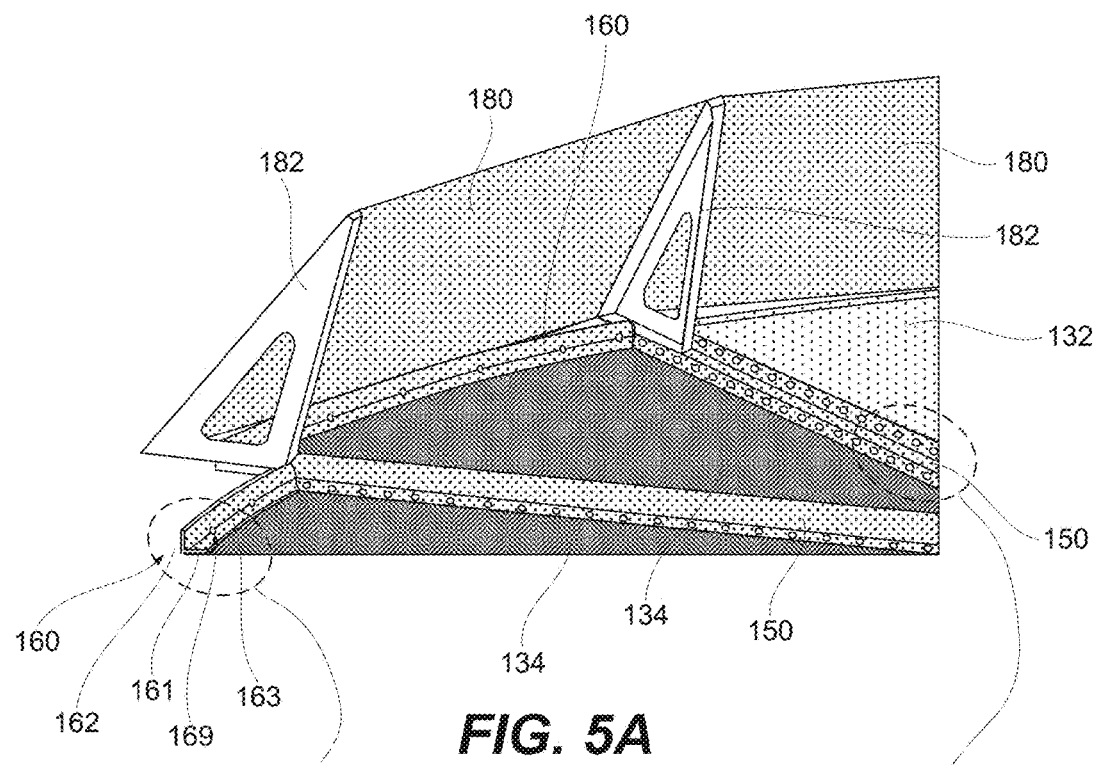
FIG. 5A
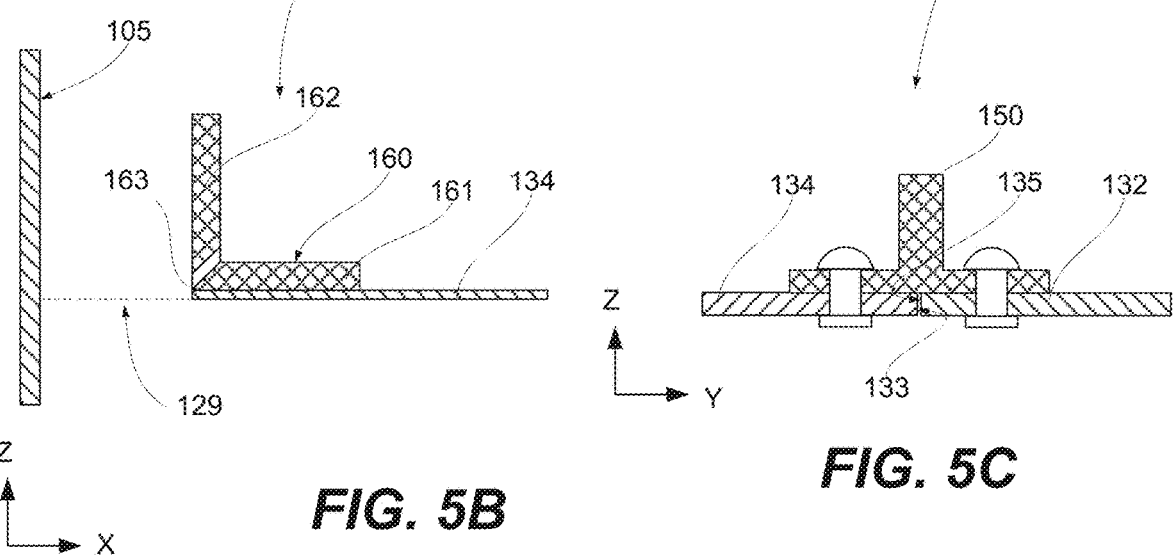
FIG. 5B
FIG. 5C

US 11,939,086 B2

FUEL TANKS AND REUSABLE LAUNCH VEHICLES COMPRISING THESE FUEL TANKS

CROSS-REFERENCE TO RELATED APPLICATIONS

This application claims the benefit under 35 U.S.C. § 119(e) of U.S. Provisional Patent Application 63/150,320, filed on 2021 Feb. 17, which is incorporated herein by reference in its entirety for all purposes.

GOVERNMENT LICENSE RIGHTS

This invention was made with Government support under HR0011-17-9-0001 awarded by Defense Advanced Research Projects Agency. The government has certain rights in this invention.

BACKGROUND

Reusable launch vehicles are designed to dump residual fuel to minimize the landing weight. The fuel is dumped through a dump tube, positioned around a sump. However, when a reusable launch vehicle decelerates during the landing, the residual fuel is forced away from the sump and also from the dump tube. This movement of the residual fuel complicates the fuel dumping process. As such, the residual fuel should be maintained proximate to the sump, even when the reusable launch vehicle decelerates.

SUMMARY

Accordingly, apparatuses and methods, intended to address at least the above-identified concerns, would find utility.

The following is a non-exhaustive list of examples of the subject matter, disclosed herein.

Disclosed herein is a fuel tank, comprising an interior wall, a sump, and a baffle that comprises a center fitting, a full-length containment petal, and a dump tube. The full-length containment petal comprises a full-length side edge, extending radially outward from the center fitting. The partial-length containment petal comprises a partial-length side edge, extending radially outward from the center fitting. The dump tube is connected to the sump. The full-length side edge of the full-length containment petal is longer than the partial-length side edge of the partial-length containment petal. All of the partial-length side edge of the partial-length containment petal is attached to a linear portion of the full-length side edge of the full-length containment petal.

The baffle is used to control the fuel distribution inside the fuel tank. More specifically, the baffle is configured to enable the fuel to flow into the portion of the fuel tank between the baffle and the sump. The baffle comprises a partial-length containment petal, which is spaced away from the interior wall of the fuel tank, enabling the fuel to flow between the partial-length containment petal and the interior wall 105. Furthermore, the baffle prevents a rapid escape of the fuel from this portion of the fuel tank, when the fuel tank is subjected to acceleration (e.g., when the reusable launch vehicle containing this fuel tank decelerates during the landing). As such, the fuel remains in this portion of the fuel tank and can be dumped from the fuel tank through the dump tube.

BRIEF DESCRIPTION OF THE DRAWINGS

Reference will now be made to the accompanying drawings, which are not necessarily drawn to scale, and where like reference characters designate the same or similar parts throughout the several views. In the drawings:

FIG. 5A is a schematic perspective cross-sectional view of the baffle and the slosh baffle of the fuel tank in the reusable launch vehicle of FIG. 1, according to one or more examples of the subject matter, disclosed herein;

FIG. 5B is a schematic side cross-sectional view of the interior wall, the partial-length containment petal, and the petal peripheral-edge stiffener of the fuel tank in the reusable launch vehicle of FIG. 1, according to one or more examples of the subject matter, disclosed herein;

FIG. 5C is a schematic side cross-sectional view of the partial-length containment petal and the full-length containment petal, interconnected by the petal side-edge stiffener of the fuel tank in the reusable launch vehicle of FIG. 1, according to one or more examples of the subject matter, disclosed herein;

FIG. 5B is a schematic side cross-sectional view of the center fitting, a portion of the full-length containment petal, and a portion of partial-length containment petal of the fuel tank in the reusable launch vehicle of FIG. 1, according to one or more examples of the subject matter, disclosed herein;

DETAILED DESCRIPTION

Figure 1:
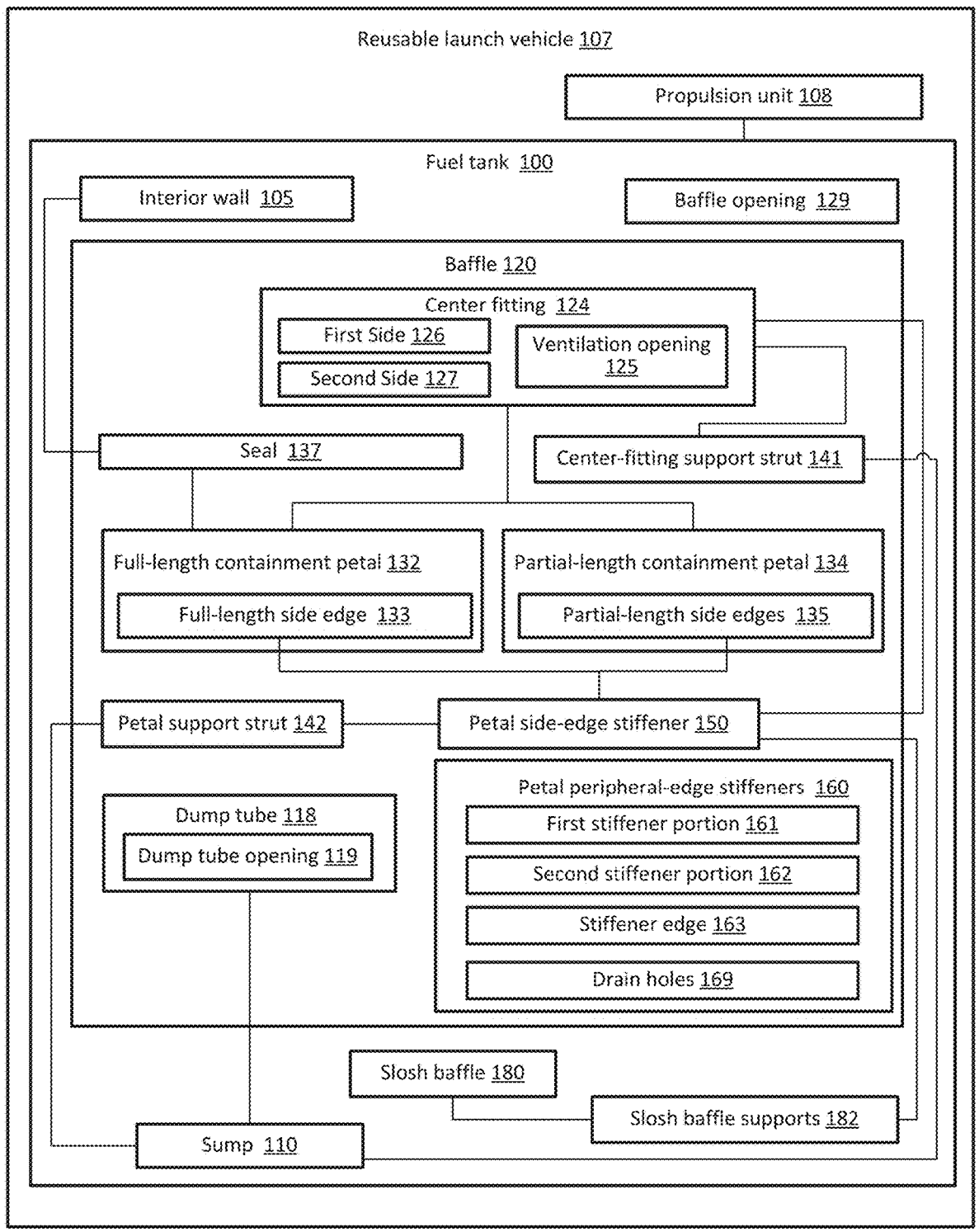
FIG. 1 is a block diagram of a reusable launch vehicle, comprising a fuel tank, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 7:
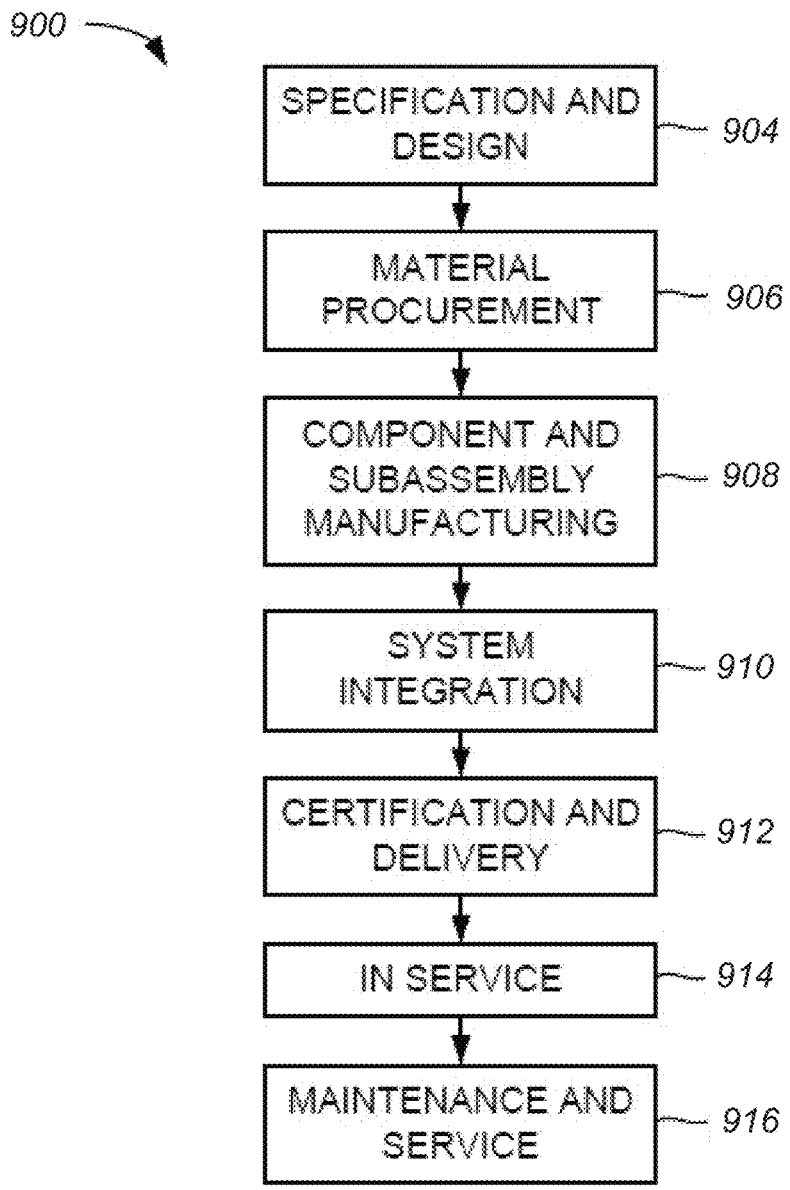
FIG. 7 is a block diagram of aircraft production and service methodology.

In FIG. 7, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 7 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need to be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having the potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Referring generally to FIG. 1 and particularly to, e.g., FIGS. 2A-2C and 3A for illustrative purposes only and not by way of limitation, the following portion of this paragraph delineates example 1 of the subject matter, disclosed herein. According to example 1, fuel tank 100 comprises interior wall 105, sump 110, and baffle 120. Baffle 120 comprises center fitting 124 and full-length containment petal 132 that comprises full-length side edge 133, extending radially outward from center fitting 124. Baffle 120 additionally comprises partial-length containment petal 134 that comprises partial-length side edge 135, extending radially outward from center fitting 124. Baffle 120 also comprises dump tube 118, connected to sump 110. Full-length side edge 133 of full-length containment petal 132 is longer than partial-length side edge 135 of partial-length containment petal 134. All of partial-length side edge 135 of partial-length containment petal 134 is attached to a linear portion of full-length side edge 133 of full-length containment petal 132.

Figure 2A:
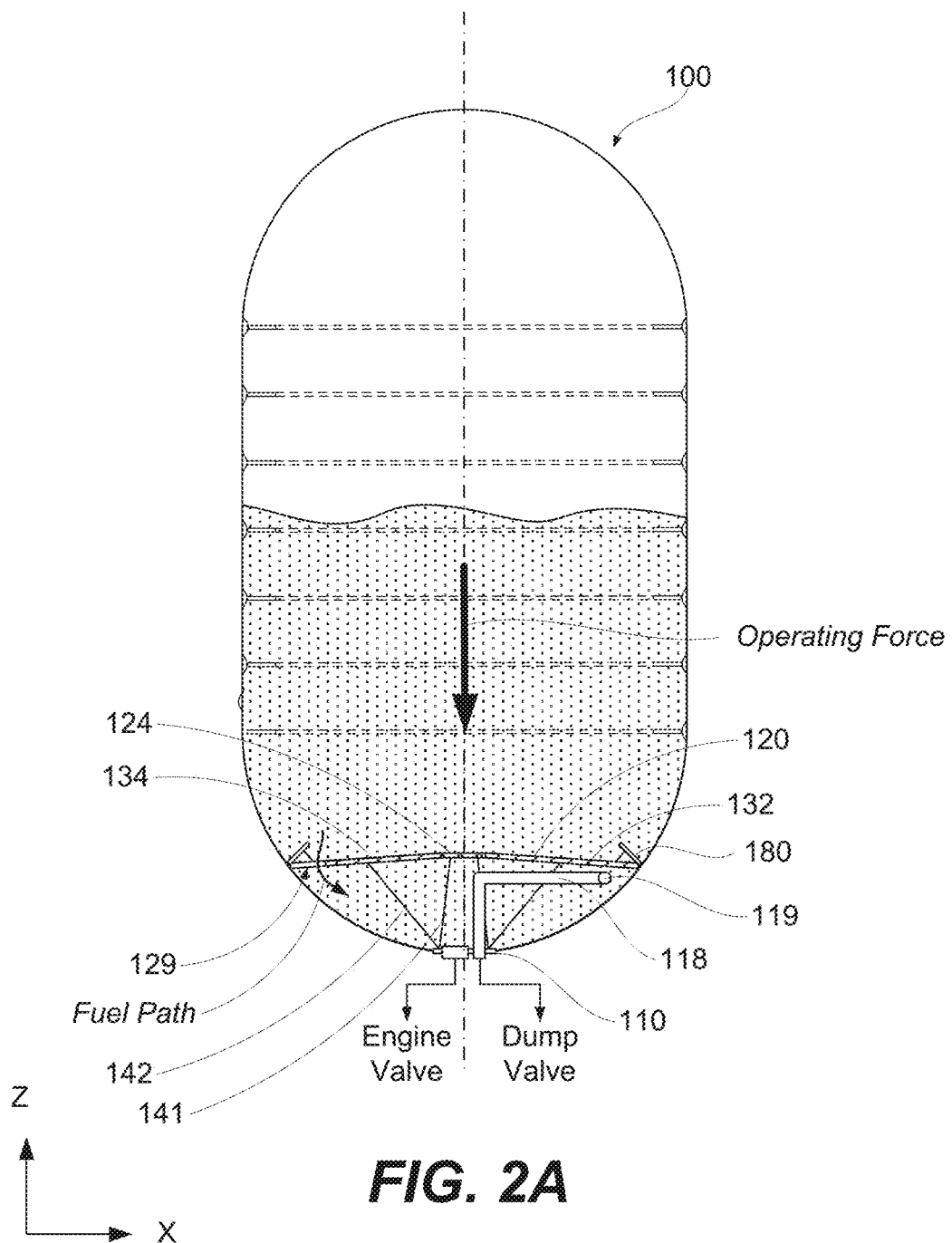
FIGS. 2A-2C are schematic side cross-sectional views of the fuel tank in the reusable launch vehicle of FIG. 1 during different operating conditions of the reusable launch vehicle, according to one or more examples of the subject matter, disclosed herein.
Figure 2B:
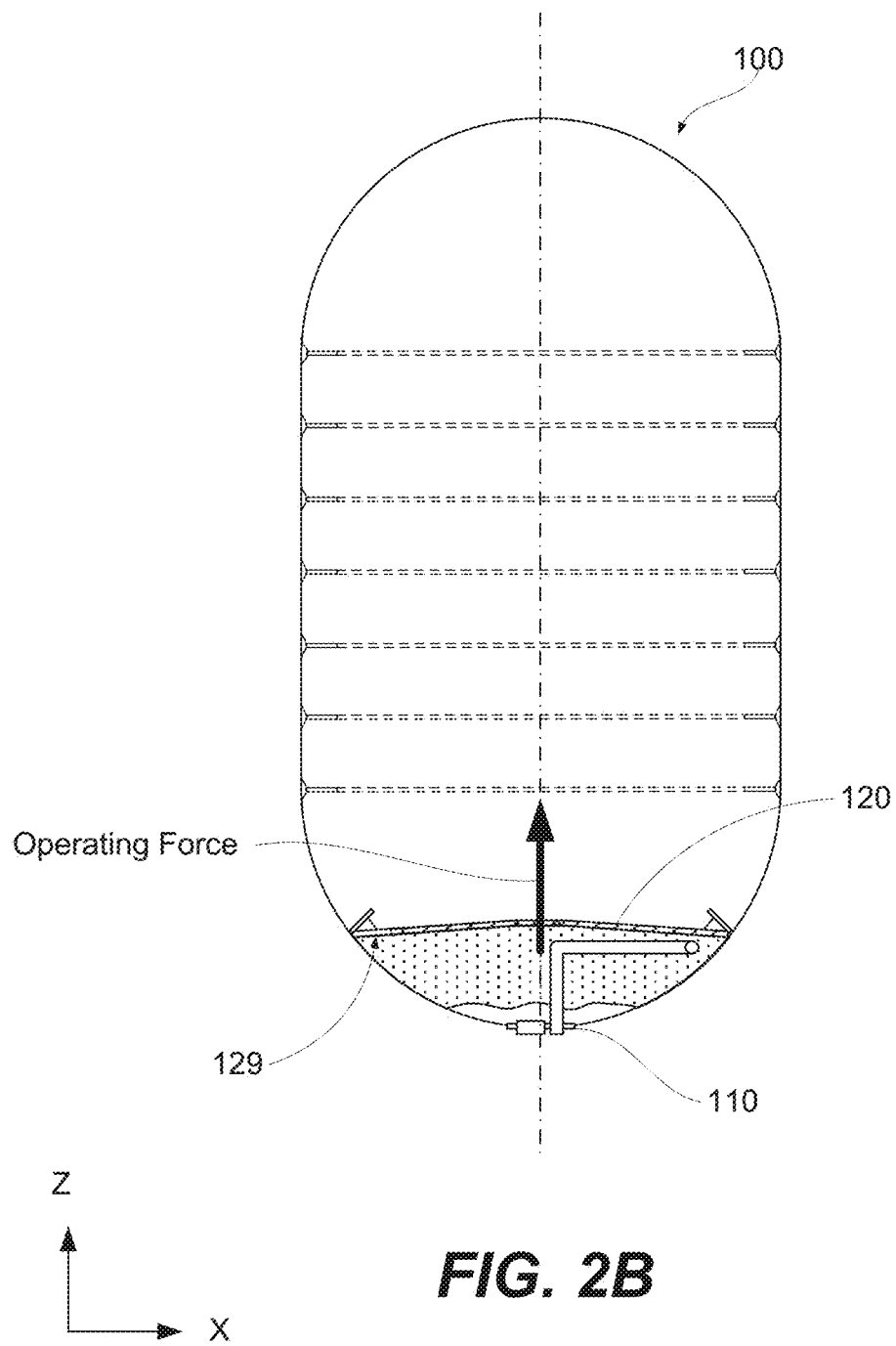
Figure 2C:
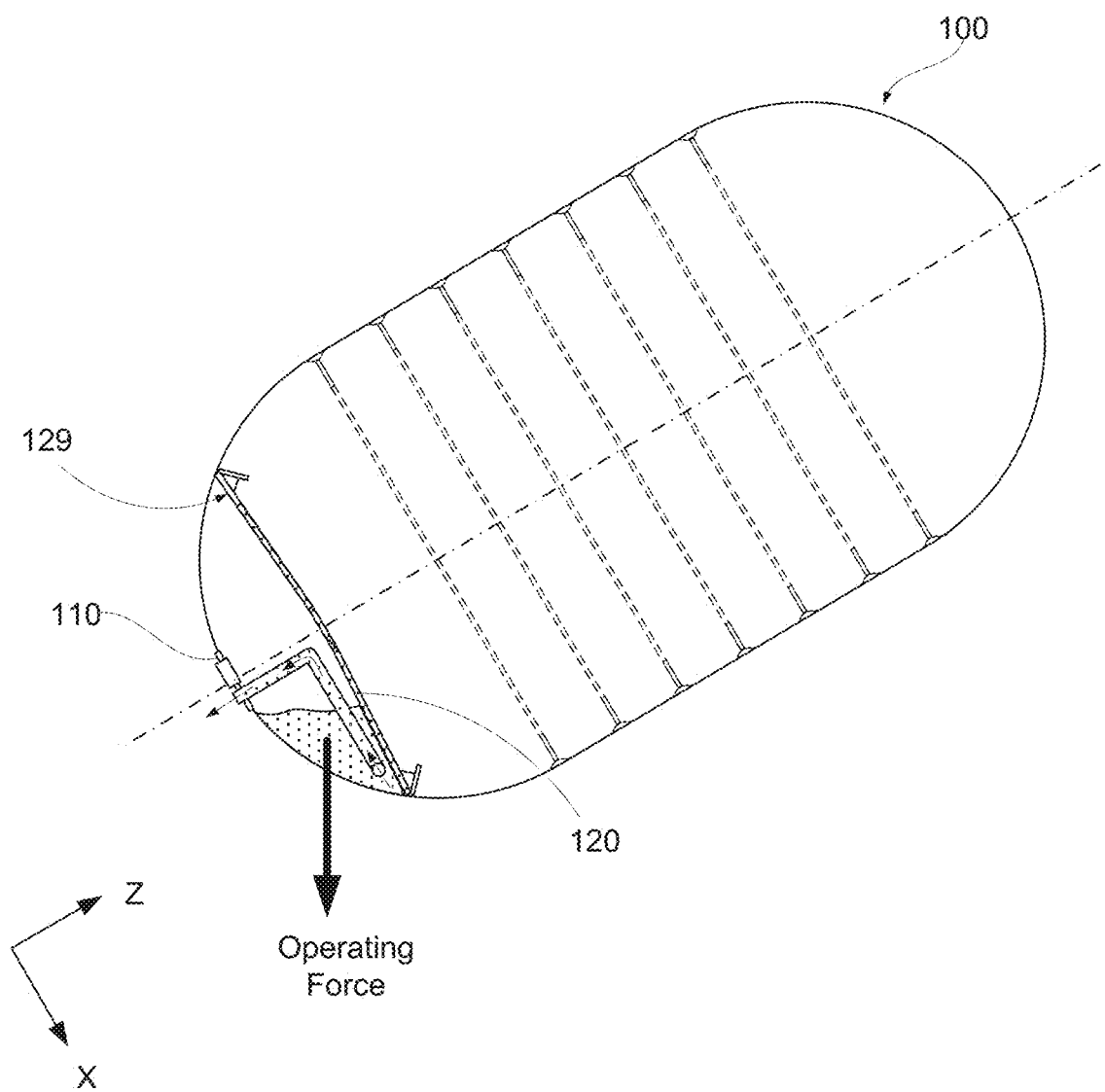

Baffle 120 is used to control the fuel distribution inside fuel tank 100. More specifically, baffle 120 is configured to enable the fuel to flow into a portion of fuel tank 100 between baffle 120 and sump 110 as, for example, is schematically shown in FIG. 2A. Baffle 120 comprises partial-length containment petal 134, which is spaced away from interior wall 105, enabling the fuel to flow between partial-length containment petal 134 and interior wall 105. Furthermore, baffle 120 prevents a rapid escape of the fuel from this portion of fuel tank 100, e.g., when is subjected to acceleration (e.g., when the reusable launch vehicle decelerates during landing) as, for example, is schematically shown in FIG. 2B. As such, the fuel remains in this portion of fuel tank 100 and can be dumped from fuel tank 100 through dump tube 118 as, for example, is schematically shown in FIG. 2C.

In some examples, interior wall 105 of fuel tank 100 is formed from a composite material, which complicates the attachment of various components to interior wall 105. For example, various conventional attachment techniques (e.g., welding) are not suitable for composite materials. In more specific examples, baffle 120 is supported by sump 110, instead of being supported by interior wall 105.

Full-length containment petal 132 extends to interior wall 105 and, in some examples, forms a seal with interior wall 105. Full-length containment petals 132 block the fuel from passing between full-length containment petal 132 and interior wall 105. At the same time, partial-length containment petal 134 is spaced away from interior wall 105 and enables the fuel to pass between partial-length containment petal 134 and interior wall 105. In general, a larger portion of the interior cross-sectional area of fuel tank 100 is blocked by baffle 120 thereby ensuring the fuel containment in the portion of fuel tank 100 between baffle 120 and sump 110. This fuel containment enables dump tube 118 to remove the remaining fuel from fuel tank 100 at various operation conditions, e.g., when fuel tank 100 decelerates.

Forming baffle 120 from center fitting 124 and multiple petals, such as full-length containment petal 132 and partial-length containment petal 134, enables the installation of baffle 120 through a small opening on one end of fuel tank 100. This opening is later sealed with sump 110. The opening is smaller than the inside diameter of the cylindrical portion of fuel tank 100. When installed inside fuel tank 100, baffle 120 has a larger diameter than this opening. Specifically, separate components of baffle 120, such as center fitting 124, full-length containment petal 132, and partial-length containment petal 134 are fed through the opening and then assembled inside fuel tank 100, collectively forming baffle 120. As such, interior wall 105 does not require additional joints and can be formed substantially monolithic.

Figure 3A:
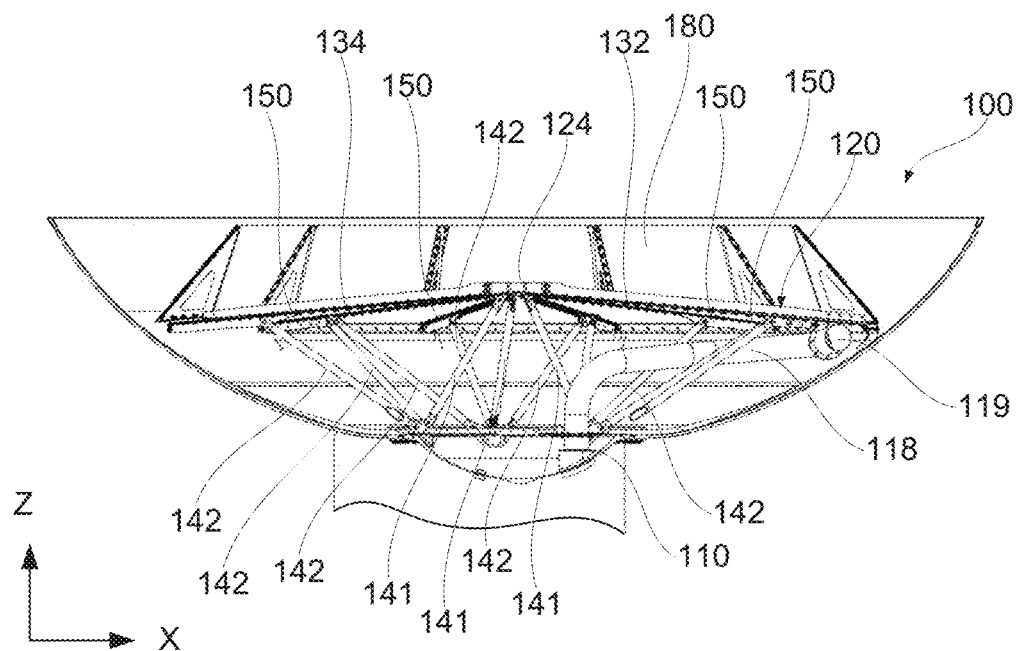
FIG. 3A is a schematic side cross-sectional view of the bottom portion of the fuel tank of the reusable launch vehicle of FIG. 1, illustrating a baffle and a slosh baffle, according to one or more examples of the subject matter, disclosed herein.

Referring generally to FIG. 1 and particularly to, e.g., FIG. 3A for illustrative purposes only and not by way of limitation, the following portion of this paragraph delineates example 2 of the subject matter, disclosed herein. According to example 2, which encompasses example 1, above, baffle 120 further comprises center-fitting support strut 141, connecting center fitting 124 to sump 110.

Center-fitting support strut 141 attaches center fitting 124 to sump 110 and also supports center fitting 124, relative to sump 110. This sump-supporting feature eliminates the need for attaching baffle 120 to interior wall 105. For example, baffle 120 is formed from a metal, while interior wall 105 is formed from a composite material. Metals and composite materials have different coefficients of thermal expansion (CTEs), which complicates the process of maintaining any direct connection over the wide temperature range. Furthermore, many common joining techniques (e.g., welding) are not available for composite materials.

In some examples, other components of baffle 120, e.g., full-length containment petal 132 and partial-length containment petal 134, are also attached to center fitting 124. As such, these other components are also indirectly supporting by center-fitting support strut 141 relative to sump 110.

Referring generally to FIG. 1 and particularly to, e.g., FIG. 3A for illustrative purposes only and not by way of limitation, the following portion of this paragraph delineates example 3 of the subject matter, disclosed herein. According to example 3, which encompasses example 1 or 2, above, baffle 120 further comprises petal support strut 142, connecting at least one of full-length containment petal 132 or partial-length containment petal 134 to sump 110.

Petal support strut 142 supports full-length containment petal 132 or partial-length containment petal 134 relative to sump 110. This sump-supporting feature eliminates the need for attaching baffle 120 to interior wall 105 For example, baffle 120 is formed from a metal, while interior wall 105 is formed from a composite material. Metals and composite materials have different coefficients of thermal expansion (CTEs), which complicates the process of maintaining any direct connection over the wide temperature range. Furthermore, many common joining techniques (e.g., welding) are not available for composite materials.

In some examples, only one of full-length containment petal 132 or partial-length containment petal 134 is connected to petal support strut 142. In one or more examples, both full-length containment petal 132 and partial-length containment petal 134 are connected to petal support strut 142.

Referring generally to FIG. 1 and particularly to, e.g., FIG. 3A for illustrative purposes only and not by way of limitation, the following portion of this paragraph delineates example 4 of the subject matter, disclosed herein. According to example 4, which encompasses example 3, above, petal support strut 142 is connected to at least one of full-length side edge 133 of full-length containment petal 132 or partial-length side edge 135 of partial-length containment petal 134.

Connecting to full-length side edge 133 of full-length containment petal 132 or partial-length side edge 135 of partial-length containment petal 134 enables supporting multiple petals with a single petal support strut. For example, full-length side edge 133 of full-length containment petal 132 or partial-length side edge 135 of partial-length containment petal 134 can be also connected to the edge of an adjacent petal. As such, petal support strut 142 can support two petals at the same time.

In some examples, petal support strut 142 is connected to full-length side edge 133 of full-length containment petal 132. In the same or other examples, petal support strut 142 is connected to partial-length side edge 135 of partial-length containment petal 134. For example, petal support strut 142 is connected to both full-length side edge 133 of full-length containment petal 132 and partial-length side edge 135 of partial-length containment petal 134. Alternatively, petal support strut 142 is connected to full-length side edge 133 of full-length containment petal 132 or partial-length side edge 135 of partial-length containment petal 134 but not both.

Figure 3B:
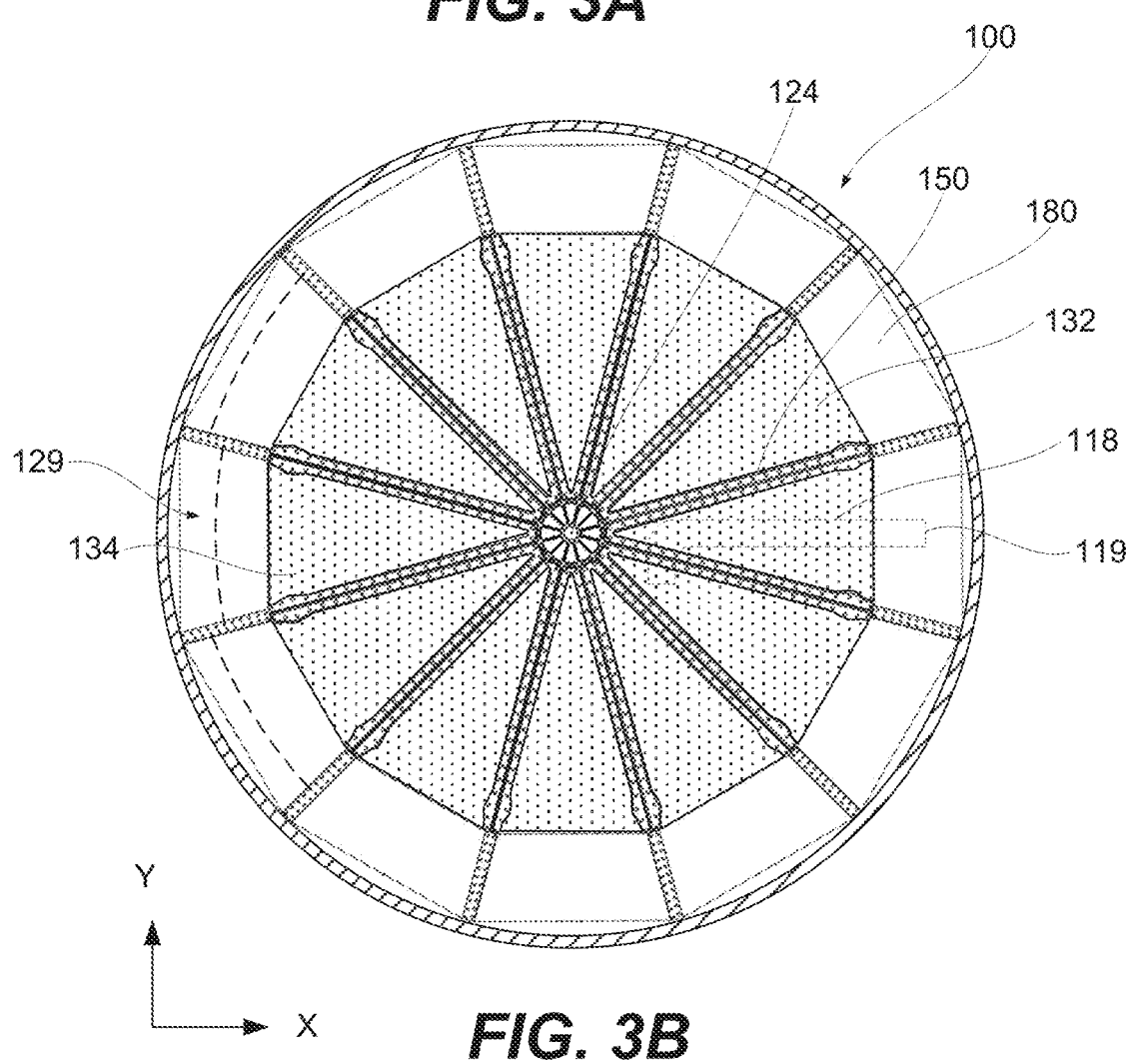
FIG. 3B is a schematic top view of the bottom portion of the fuel tank of the reusable launch vehicle of FIG. 1, illustrating containment petals, forming a baffle, and a slosh baffle, positioned over the containment petals, according to one or more examples of the subject matter, disclosed herein.

Referring generally to FIG. 1 and particularly to, e.g., FIGS. 3B, 5A, and 5C for illustrative purposes only and not by way of limitation, the following portion of this paragraph delineates example 5 of the subject matter, disclosed herein. According to example 5, which encompasses example 4, above, baffle 120 further comprises petal side-edge stiffener 150, attached to at least one of full-length side edge 133 of full-length containment petal 132 or partial-length side edge 135 of partial-length containment petal 134. Petal support strut 142 is attached to petal side-edge stiffener 150.

Petal side-edge stiffener 150 reinforces at least one of full-length side edge 133 of full-length containment petal 132 or partial-length side edge 135 of partial-length containment petal 134. For example, full-length containment petal 132 and partial-length side edge 135 of partial-length containment petal 134 are formed as thin sheets to reduce the overall weight of fuel tank 100. Petal side-edge stiffener 150 extends out of the plane, providing some additional rigidity to the overall assembly formed by petal side-edge stiffener 150 and at least one of full-length containment petal 132 and partial-length containment petal 134.

In some examples, petal side-edge stiffener 150 interconnects to two adjacent petals as, e.g., is shown in FIG. 3B. For example, petal side-edge stiffener 150 interconnects full-length containment petal 132 and partial-length containment petal 134 as, e.g., is shown in FIG. 5C. In one or more examples, petal side-edge stiffener 150 interconnects two full-length containment petals. Furthermore, in one or more examples, petal side-edge stiffener 150 interconnects two partial-length containment petals as, e.g., is shown in FIG. 5A.

Referring generally to FIG. 1 and particularly to, e.g., FIG. 3A for illustrative purposes only and not by way of limitation, the following portion of this paragraph delineates example 6 of the subject matter, disclosed herein. According to example 6, which encompasses example 3, above, petal support strut 142 is connected to both full-length containment petal 132 and partial-length containment petal 134.

When petal support strut 142 is connected to multiple petals, such as full-length containment petal 132 and partial-length containment petal 134, fewer petal support struts are needed in fuel tank 100. As such, fuel tank 100 has a lower overall weight, which is desirable for many applications. In some examples, petal support strut 142 is connected to two full-length containment petals. In other examples, petal support strut 142 is connected to two partial-length containment petals.

Referring generally to FIG. 1 and particularly to, e.g., FIGS. 3A and 3B for illustrative purposes only and not by way of limitation, the following portion of this paragraph delineates example 7 of the subject matter, disclosed herein. According to example 7, which encompasses example 6, above, petal support strut 142 is connected to both full-length side edge 133 of full-length containment petal 132 and partial-length side edge 135 of partial-length containment petal 134.

Connecting to edges of multiple petals, such as full-length side edge 133 of full-length containment petal 132 and partial-length side edge 135 partial-length containment petal 134, enables using fewer petal support struts in fuel tank 100. As such, the overall weight of fuel tank 100 is reduced, which is desirable for many applications.

In some examples, full-length side edge 133 of full-length containment petal 132 and partial-length side edge 135 partial-length containment petal 134 are interconnected, in addition to being connected to petal support strut 142. This overall connection helps to strengthen the assembly.

Referring generally to FIG. 1 and particularly to, e.g., FIGS. 3A, 3B, 5A, and 5C for illustrative purposes only and not by way of limitation, the following portion of this paragraph delineates example 8 of the subject matter, disclosed herein. According to example 8, which encompasses example 7, above, baffle 120 further comprises petal side-edge stiffener 150. Petal side-edge stiffener 150 attaches full-length side edge 133 of full-length containment petal 132 to partial-length side edge 135 of partial-length containment petal 134. Petal side-edge stiffener 150 is connected to petal support strut 142.

Petal side-edge stiffener 150 reinforces full-length side edge 133 of full-length containment petal 132 and partial-length side edge 135 of partial-length containment petal 134. Furthermore, petal side-edge stiffener 150 reinforces full-length side edge 133 of full-length containment petal 132 and partial-length side edge 135 of partial-length containment petal 134 thereby reinforcing the overall structure of baffle 120 and the ability of baffle 120 to withstand forces from the fuel. For example, full-length containment petal 132 and partial-length side edge 135 of partial-length containment petal 134 are formed as thin sheets to reduce the overall weight of fuel tank 100. Petal side-edge stiffener 150 extends out of the plane, providing additional rigidity to the overall assembly of petal side-edge stiffener 150, full-length containment petal 132, and partial-length containment petal 134. Therefore, petal support strut 142 is connected to the reinforced petal edges.

In some examples, petal side-edge stiffener 150 extends along the entire length of partial-length side edge 135 of partial-length containment petal 134. In more specific examples, petal side-edge stiffener 150 extends along the entire length of full-length side edge 133 of full-length containment petal 132.

Figure 6A:
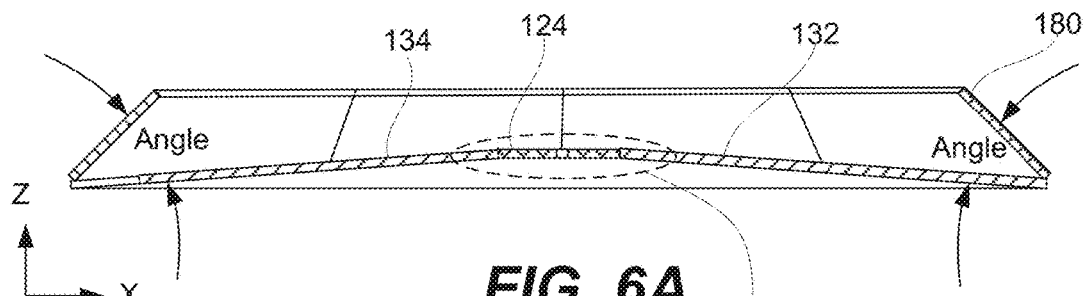
FIG. 6A is a schematic side cross-sectional view of the baffle and the slosh baffle of the fuel tank in the reusable launch vehicle of FIG. 1, according to one or more examples of the subject matter, disclosed herein.
Figure 6B:
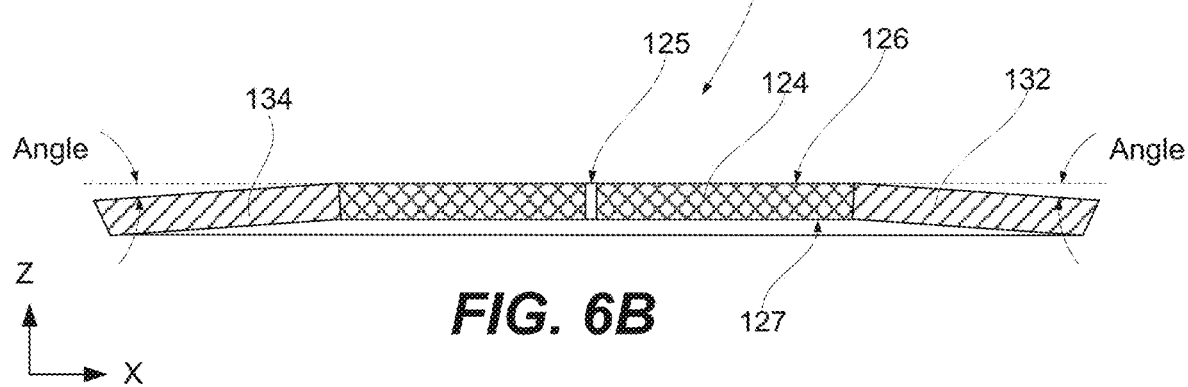
FIG. 6C is a schematic top view of the center fitting of the fuel tank in the reusable launch vehicle of FIG. 1, according to one or more examples of the subject matter, disclosed herein.
Figure 6C:
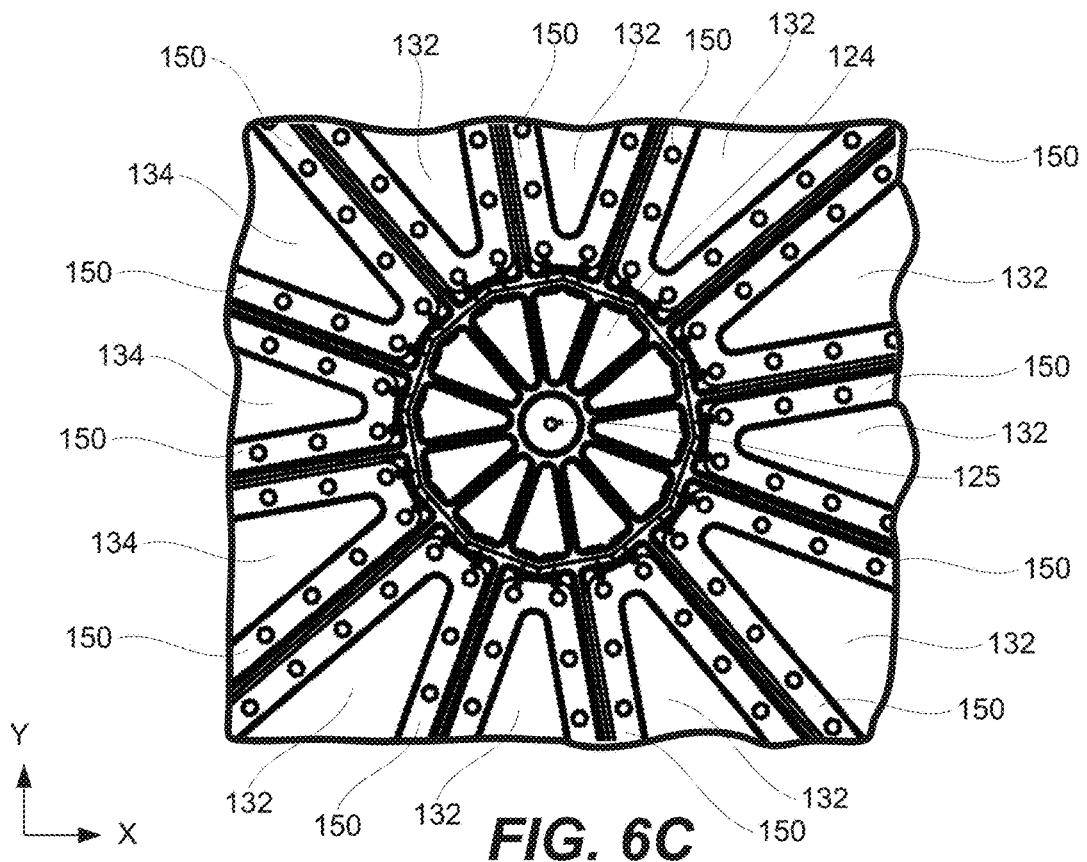

Referring generally to FIG. 1 and particularly to, e.g., FIGS. 3A, 3B, and 6C for illustrative purposes only and not by way of limitation, the following portion of this paragraph delineates example 9 of the subject matter, disclosed herein. According to example 9, which encompasses any one of examples 1 to 8, above, baffle 120 further comprises petal side-edge stiffener 150, attached to center fitting 124 and to at least one of full-length side edge 133 of full-length containment petal 132 or partial-length side edge 135 of partial-length containment petal 134.

Petal side-edge stiffener 150 reinforces at least one of full-length side edge 133 of full-length containment petal 132 or partial-length side edge 135 of partial-length containment petal 134. For example, full-length containment petal 132 and partial-length side edge 135 of partial-length containment petal 134 are formed as thin sheets to reduce the overall weight of fuel tank 100. Petal side-edge stiffener 150 extends out of the plane, providing additional rigidity to the overall assembly of petal side-edge stiffener 150 at least one of full-length containment petal 132 and partial-length containment petal 134. Furthermore, petal side-edge stiffener 150 interconnects center fitting 124 and full-length containment petal 132 or partial-length containment petal 134 thereby ensuring the overall mechanical integrity of baffle 120. This attachment also provides support to center fitting 124.

In some examples, petal side-edge stiffener 150 interconnects to two adjacent petals as, e.g., is shown in FIG. 3B. For example, petal side-edge stiffener 150 interconnects full-length containment petal 132 and partial-length containment petal 134 as, e.g., is shown in FIG. 5C. In the same or other examples, petal side-edge stiffener 150 interconnects two full-length containment petals. Furthermore, in some examples, petal side-edge stiffener 150 interconnects two partial-length containment petals as, e.g., is shown in FIG. 5A.

Referring generally to FIG. 1 and particularly to, e.g., FIGS. 4B and 4C for illustrative purposes only and not by way of limitation, the following portion of this paragraph delineates example 10 of the subject matter, disclosed herein. According to example 10, which encompasses any one of examples 1 to 8, above, baffle 120 further comprises petal side-edge stiffener 150, attached to center fitting 124 and to both full-length side edge 133 of full-length containment petal 132 and partial-length side edge 135 of partial-length containment petal 134.

Petal side-edge stiffener 150 reinforces both full-length side edge 133 of full-length containment petal 132 and partial-length side edge 135 of partial-length containment petal 134. For example, full-length containment petal 132 and partial-length side edge 135 of partial-length containment petal 134 are formed as thin sheets to reduce the overall weight of fuel tank 100. Petal side-edge stiffener 150 extends out of the plane, providing additional rigidity of the overall assembly of petal side-edge stiffener 150 at least one of full-length containment petal 132 and partial-length containment petal 134. Furthermore, petal side-edge stiffener 150 interconnects center fitting 124 and full-length containment petal 132 and partial-length containment petal 134 thereby ensuring the overall mechanical integrity of baffle 120. This attachment also provides support to center fitting 124.

In some examples, petal side-edge stiffener 150 extends along the entire length of partial-length side edge 135 of partial-length containment petal 134. In more specific examples, petal side-edge stiffener 150 extends along the entire length of full-length side edge 133 of full-length containment petal 132.

Referring generally to FIG. 1 and particularly to, e.g., FIGS. 2A-2C and 4 for illustrative purposes only and not by way of limitation, the following portion of this paragraph delineates example 11 of the subject matter, disclosed herein. According to example 11, which encompasses any one of examples 1 to 10, above, full-length containment petal 132 is sealed against interior wall 105. Partial-length containment petal 134 is spaced away from interior wall 105, forming gap 129 between partial-length containment petal 134 and interior wall 105.

The sealing of full-length containment petal 132 against interior wall 105 ensures that the fuel does not flow between full-length containment petal 132 and interior wall 105 and that the fuel is contained in a portion of fuel tank 100 between baffle 120 and sump 110. This fuel containment ensures that the fuel can be dumped even when fuel tank 100 decelerates, e.g., as shown in FIGS. 2B and 2C. At the same time, gap 129 enables the fuel to flow into this portion of fuel tank 100 as, e.g., is shown in FIG. 2A. The surface area ratio of full-length containment petal 132 and partial-length containment petal 134 define the containment properties of baffle 120.

Figure 4:
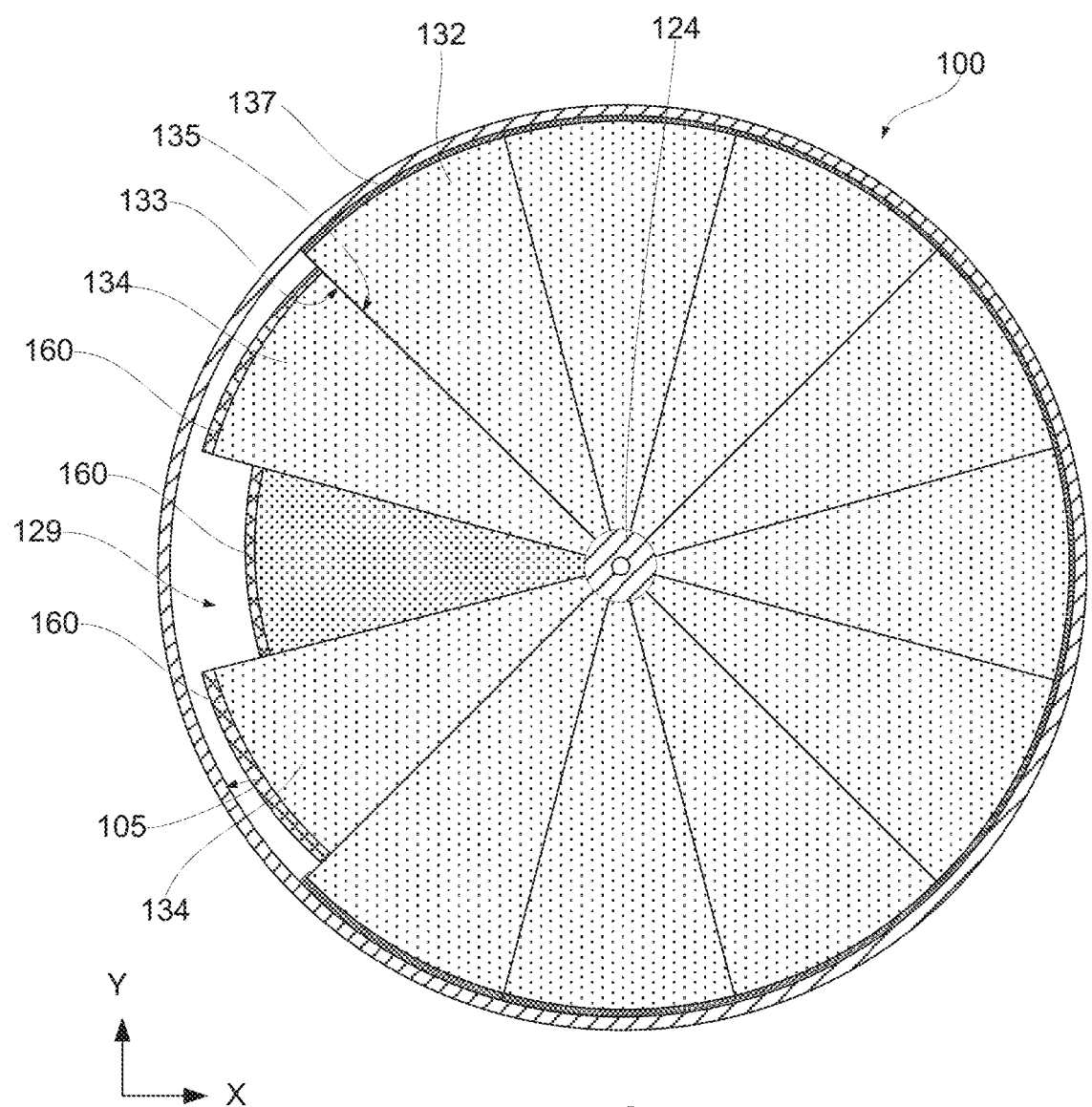
FIG. 4 is a schematic top view of the baffle of the fuel tank of the reusable launch vehicle of FIG. 1, illustrating a gap between the partial-length containment petals of the baffle and the interior wall of the fuel tank, according to one or more examples of the subject matter, disclosed herein.

Referring generally to FIG. 1 and particularly to, e.g., FIG. 4 for illustrative purposes only and not by way of limitation, the following portion of this paragraph delineates example 12 of the subject matter, disclosed herein. According to example 12, which encompasses example 11, above, fuel tank 100 further comprises flexible seal 137 that seals full-length containment petal 132 against interior wall 105.

Flexible seal 137 ensures that the fuel cannot flow between full-length containment petal 132 against interior wall 105. In some examples, full-length containment petal 132 and interior wall 105 are formed from different materials and have different CTEs. Flexible seal 137 ensures that that the space between full-length containment petal 132 and interior wall 105 remains sealed over a wide range of temperatures. In some examples, flexible seal 137 is formed from a flexible material, such as a polymer.

Referring generally to FIG. 1 and particularly to, e.g., FIGS. 2A-2C and 3A for illustrative purposes only and not by way of limitation, the following portion of this paragraph delineates example 13 of the subject matter, disclosed herein. According to example 13, which encompasses example 11 or 12, above, dump tube 118 comprises dump-tube opening 119. Gap 129 and dump-tube opening 119 are located on opposite sides of center fitting 124.

Dump-tube opening 119 is used to collect the fuel from fuel tank 100. The fuel collection is particularly challenging when fuel tank 100 is near empty as, e.g., is shown in FIG. 2C. At this point, baffle 120 contains the remaining fuel in the portion of fuel tank 100 between baffle 120 and sump 110. It should be noted that dump-tube opening 119 allows the fuel into this portion of fuel tank 100. In some examples, fuel tank 100 is tilted such that the remaining fuel is kept away from dump-tube opening 119, such that the fuel does not escape from this portion of fuel tank 100 through dump-tube opening 119. Positioning dump-tube opening 119, opposite on opposite sides of center fitting 124, from gap 129, enables collecting the remaining fuel from this portion of fuel tank 100 while keeping the fuel away from gap 129 as, e.g., is schematically shown in FIG. 2C.

In some examples, dump-tube opening 119 faces interior wall 105 to ensure better fuel collection when fuel tank 100 is tilted toward this portion of interior wall 105.

Referring generally to FIG. 1 and particularly to, e.g., FIGS. 2A-2C, 3A, 3B, and 5A, for illustrative purposes only and not by way of limitation, the following portion of this paragraph delineates example 14 of the subject matter, disclosed herein. According to example 14, which encompasses any one of examples 1 to 13, above, fuel tank 100 further comprises slosh baffle 180, attached to baffle 120 such that full-length containment petal 132 and partial-length containment petal 134 are located between slosh baffle 180 and sump 110.

Slosh baffle 180 dampens the fuel movement in fuel tank 100, e.g., along interior wall 105. For example, when fuel tank 100 is partially filled, any accelerations of fuel tank 100 causes the fuel slosh. This fuel slosh, if not mitigated, can adversely affect the overall system, e.g, orientation. Furthermore, attaching slosh baffle 180 to baffle 120 eliminated the need to form connections to interior wall 105 of fuel tank 100, which can be challenging.

In some examples, slosh baffle 180 is attached to baffle 120 along the perimeter of interior wall 105. In other words, slosh baffle 180 forms a ring within fuel tank 100, proximate to interior wall 105.

Referring generally to FIG. 1 and particularly to, e.g., FIG. 5A for illustrative purposes only and not by way of limitation, the following portion of this paragraph delineates example 15 of the subject matter, disclosed herein. According to example 15, which encompasses example 14, above, fuel tank 100 further comprises slosh-baffle support 182 that attaches slosh baffle 180 to at least one of full-length containment petal 132 or partial-length containment petal 134.

Slosh baffle 180 dampens the fuel movement in fuel tank 100, e.g., along interior wall 105. As such, slosh baffle 180 needs to be well support within fuel tank 100. Attaching slosh baffle 180 to baffle 120 eliminated the need to form connections to interior wall 105 of fuel tank 100, which can be challenging. Baffle 120 connects slosh baffle 180 to sump 110 of fuel tank 100.

In some examples, slosh baffle 180 comprises multiple petals. Slosh-baffle support 182 is used to interconnect two adjacent petals of slosh baffle 180. Slosh-baffle support 182 can also interconnect these two adjacent petals.

Referring generally to FIG. 1 and particularly to, e.g., FIG. 5A for illustrative purposes only and not by way of limitation, the following portion of this paragraph delineates example 16 of the subject matter, disclosed herein. According to example 16, which encompasses example 15, above, baffle 120 further comprises petal side-edge stiffener 150, attached to at least one of full-length side edge 133 of full-length containment petal 132 or partial-length side edge 135 of partial-length containment petal 134. Slosh-baffle support 182 is attached to petal side-edge stiffener 150.

Petal side-edge stiffener 150 reinforces at least one of full-length side edge 133 of full-length containment petal 132 or partial-length side edge 135 of partial-length containment petal 134. For example, full-length containment petal 132 and partial-length side edge 135 of partial-length containment petal 134 are formed as thin sheets to reduce the overall weight of fuel tank 100. Petal side-edge stiffener 150 extends out of the plane providing additional rigidity to the overall assembly. Slosh-baffle support 182 is connected to this reinforced assembly. As such, slosh-baffle support 182 is supported by multiple components at the same time, e.g., petal side-edge stiffener 150 and at least one of full-length side edge 133 of full-length containment petal 132 or partial-length side edge 135 of partial-length containment petal 134.

Various forms of connections between slosh-baffle support 182 and petal side-edge stiffener 150 are contemplated. For example, slosh-baffle support 182 and petal side-edge stiffener 150 can be riveted together. It should be noted that this attachment is performed inside fuel tank 100.

Referring generally to FIG. 1 and particularly to, e.g., FIG. 5A for illustrative purposes only and not by way of limitation, the following portion of this paragraph delineates example 17 of the subject matter, disclosed herein. According to example 17, which encompasses example 14, above, fuel tank 100 further comprises slosh-baffle support 182 that attaches slosh baffle 180 to both full-length containment petal 132 and partial-length containment petal 134.

Attaching slosh baffle 180 to baffle 120, e.g., using slosh-baffle support 182, eliminates the need to form connections to interior wall 105 of fuel tank 100, which can be challenging. Furthermore, when slosh-baffle support 182 attaches slosh baffle 180 to both full-length containment petal 132 and partial-length containment petal 134, slosh-baffle support 182 is supported by both full-length containment petal 132 and partial-length containment petal 134.

Various forms of connections between slosh-baffle support 182 and each of full-length containment petal 132 and partial-length containment petal 134 are contemplated. For example, slosh-baffle support 182 and each full-length containment petal 132 and partial-length containment petal 134 can be riveted together. It should be noted that this attachment is performed inside fuel tank 100.

Referring generally to FIG. 1 and particularly to, e.g., FIG. 5A for illustrative purposes only and not by way of limitation, the following portion of this paragraph delineates example 18 of the subject matter, disclosed herein. According to example 18, which encompasses example 17, above, baffle 120 further comprises petal side-edge stiffener 150, attached to both full-length side edge 133 of full-length containment petal 132 and partial-length side edge 135 of partial-length containment petal 134. Slosh-baffle support 182 is attached to petal side-edge stiffener 150.

In some examples, petal side-edge stiffener 150 reinforces both full-length side edge 133 of full-length containment petal 132 and partial-length side edge 135 of partial-length containment petal 134. Furthermore, in these examples, petal side-edge stiffener 150 interconnects full-length side edge 133 of full-length containment petal 132 and partial-length side edge 135 of partial-length containment petal 134. Therefore, attaching slosh-baffle support 182 to petal side-edge stiffener 150 effectively connects slosh-baffle support 182 to full-length containment petal 132 and partial-length containment petal 134.

Various forms of connections between slosh-baffle support 182 and petal side-edge stiffener 150 are contemplated. For example, slosh-baffle support 182 and petal side-edge stiffener 150 can be riveted together. It should be noted that this attachment is performed inside fuel tank 100.

Referring generally to FIG. 1 and particularly to, e.g., FIG. 6A for illustrative purposes only and not by way of limitation, the following portion of this paragraph delineates example 19 of the subject matter, disclosed herein. According to example 19, which encompasses any one of examples 14 to 18, above, an angle from 60° to 80° is formed between slosh baffle 180 and full-length containment petal 132.

The angle between slosh baffle 180 and full-length containment petal 132 is selected to redirect the fuel inside fuel tank 100 and to mitigate undesirable slosh conditions. Furthermore, this angle controls the forces, applied by the fuel (e.g., during acceleration of fuel tank 100). For example, when the fuel travels along interior wall 105, slosh baffle 180 can redirect the fuel toward interior wall 105, thereby reducing the impact of the fuel on baffle 120.

The angle between slosh baffle 180 and full-length containment petal 132 is controlled by the attachment structures, such as slosh-baffle support 182. It should be noted that full-length containment petal 132 is not necessarily perpendicular to interior wall 105.

Referring generally to FIG. 1 and particularly to, e.g., FIG. 6A for illustrative purposes only and not by way of limitation, the following portion of this paragraph delineates example 20 of the subject matter, disclosed herein. According to example 20, which encompasses any one of examples 14 to 19, above an angle from 60° to 80° is formed between slosh baffle 180 and partial-length containment petal 134.

The angle between slosh baffle 180 and partial-length containment petal 134 is selected to redirect the fuel inside fuel tank 100 and to mitigate undesirable slosh conditions. Furthermore, this angle controls the forces, applied by the fuel (e.g., during acceleration of fuel tank 100). For example, when the fuel travels along interior wall 105, slosh baffle 180 can redirect the fuel toward interior wall 105 thereby reducing the impact of the fuel on baffle 120.

The angle between slosh baffle 180 and partial-length containment petal 134 is controlled by the attachment structures, such as slosh-baffle support 182. It should be noted that full-length containment petal 132 is not necessarily perpendicular to interior wall 105.

Referring generally to FIG. 1 and particularly to, e.g., FIG. 6B for illustrative purposes only and not by way of limitation, the following portion of this paragraph delineates example 21 of the subject matter, disclosed herein. According to example 21, which encompasses any one of examples 1 to 20, above, center fitting 124 comprises first side 126, facing away from sump 110, and second side 127, facing toward sump 110. Each of full-length containment petal 132 and partial-length containment petal 134 forms an angle from 5° to 15° with first side 126 of center fitting 124.

The angle of 5° to 15° between each of full-length containment petal 132 and partial-length containment petal 134 and first side 126 of center fitting 124 helps to manage the gas flow inside fuel tank 100. Specifically, as the fuel is being removed from fuel tank 100, an increasing volume inside fuel tank 100 is occupied by the gas (e.g., backfilled into fuel tank 100). Some gas can enter a portion of fuel tank 100 between baffle 120 and sump 110. The angle of between each of full-length containment petal 132 and partial-length containment petal 134 and first side 126 of center fitting 124 ensures that this gas stays close to center fitting 124 and, for example, away from dump tube 118 at least during certain orientations of fuel tank 100.

In some examples, the angle between first side 126 of center fitting 124 and each of full-length containment petal 132 and partial-length containment petal 134 is set by the design of center fitting 124 and each of full-length containment petal 132 and partial-length containment petal 134, For example, center fitting 124 comprises a side edge, extending between first side 126 and second side 127 and to which each of full-length containment petal 132 and partial-length containment petal 134 is attached.

Referring generally to FIG. 1 and particularly to, e.g., FIG. 6B for illustrative purposes only and not by way of limitation, the following portion of this paragraph delineates example 22 of the subject matter, disclosed herein. According to example 22, which encompasses example 21, above center fitting 124 comprises ventilation opening 125 that extends from first side 126 to second side 127 of center fitting 124.

Ventilation opening 125 helps to manage the gas flow inside fuel tank 100. Specifically, as the fuel is being removed from fuel tank 100, an increasing volume inside fuel tank 100 is occupied by the gas (e.g., backfilled into fuel tank 100). Some gas can enter a portion of fuel tank 100 between baffle 120 and sump 110 and stays close to center fitting 124. Ventilation opening 125 in center fitting 124 enables this gas to escape through center fitting 124.

The size of ventilation opening 125 is selected such that the gas can to escape through center fitting 124, while the fuel is contained by center fitting 124. If any amount of the fuel passes through center fitting 124, this amount is insignificant.

Referring generally to FIG. 1 and particularly to, e.g., FIGS. 4, 5A, and 5B for illustrative purposes only and not by way of limitation, the following portion of this paragraph delineates example 23 of the subject matter, disclosed herein. According to example 23, which encompasses any one of examples 1 to 22, above, fuel tank 100 further comprises petal peripheral-edge stiffener 160, attached to partial-length containment petal 134 such that petal peripheral-edge stiffener 160 partially overlaps partial-length side edge 135 of partial-length containment petal 134 at one end of partial-length side edge 135.

Partial-length containment petal 134 does not extend or connected to interior wall 105. Instead, a wall-facing edge of partial-length containment petal 134 is spaced apart from interior wall 105. Petal peripheral-edge stiffener 160 is attached to partial-length containment petal 134 at this wall-facing edge to provide additional rigidity to the edge. As such, when the fuel passes through space between partial-length containment petal 134 is spaced apart from interior wall 105, this edge is not deformed.

In some examples, petal peripheral-edge stiffener 160 extend between two partial-length side edges of partial-length containment petal 134. In other words, petal peripheral-edge stiffener 160 spans the entire length of the wall-facing edge of partial-length containment petal 134. Furthermore, in some examples, petal peripheral-edge stiffener 160, is attached to other components, such as one or two petal side-edge stiffeners.

Referring generally to FIG. 1 and particularly to, e.g., FIG. 4 for illustrative purposes only and not by way of limitation, the following portion of this paragraph delineates example 24 of the subject matter, disclosed herein. According to example 24, which encompasses example 23, above, petal peripheral-edge stiffener 160 is spaced away from interior wall 105 so that gap 129 is provided between petal peripheral-edge stiffener 160 and interior wall 105.

Gap 129 enables the fuel to enter a portion of fuel tank 100 between baffle 120 and sump 110. Petal peripheral-edge stiffener 160 supports the edge of partial-length containment petal 134, which faces interior wall 105. As such, partial-length containment petal 134 is more capable of resisting forces from the fuel when fuel tank 100 moves or, more specifically, accelerates.

In some examples, petal peripheral-edge stiffener 160 extend between two partial-length side edges of partial-length containment petal 134. In other words, petal peripheral-edge stiffener 160 spans the entire length of the wall-facing edge of partial-length containment petal 134. Furthermore, in some examples, petal peripheral-edge stiffener 160, is attached to other components, such as one or two petal side-edge stiffeners.

Referring generally to FIG. 1 and particularly to, e.g., FIGS. 5A and 5B for illustrative purposes only and not by way of limitation, the following portion of this paragraph delineates example 25 of the subject matter, disclosed herein. According to example 25, which encompasses example 23 or 24, above, petal peripheral-edge stiffener 160 comprises first stiffener portion 161 and second stiffener portion 162. First stiffener portion 161 is directly connected to partial-length containment petal 134. Second stiffener portion 162 extends from first stiffener portion 161 and is perpendicular to partial-length containment petal 134.

Second stiffener portion 162, being perpendicular to partial-length containment petal 134, provides the out-of-plane rigidity to partial-length containment petal 134 or, more specifically, to the edge of partial-length containment petal 134 along which petal peripheral-edge stiffener 160 is attached to partial-length containment petal 134. In some examples, fuel tank 100 moves or, more specifically, accelerates in a direction that is roughly perpendicular to partial-length containment petal 134. This acceleration of fuel tank 100 creates forces from the fuel, which act (in the opposite direction) onto internal components of fuel tank 100, including partial-length containment petal 134.

In some examples, petal peripheral-edge stiffener 160 extend between two partial-length side edges of partial-length containment petal 134. In other words, petal peripheral-edge stiffener 160 spans the entire length of the wall-facing edge of partial-length containment petal 134. Furthermore, in some examples, petal peripheral-edge stiffener 160, is attached to other components, such as one or two petal side-edge stiffeners.

Referring generally to FIG. 1 and particularly to, e.g., FIGS. 5A and 5B for illustrative purposes only and not by way of limitation, the following portion of this paragraph delineates example 26 of the subject matter, disclosed herein. According to example 26, which encompasses example 25, above, first stiffener portion 161 and second stiffener portion 162 of petal peripheral-edge stiffener 160 define stiffener edge 163. Petal peripheral-edge stiffener 160 further comprises drain holes 169, located along stiffener edge 163.

In some examples, some residual fuel is trapped over partial-length containment petal 134 without being able to drain into a portion of fuel tank 100 between baffle 120 and sump 110. More specifically, second stiffener portion 162, which extends perpendicular to partial-length containment petal 134 prevents this residual fuel from reaching gap 129, which is on the other side of petal peripheral-edge stiffener 160. Drain holes 169 enable the fuel to travel through petal peripheral-edge stiffener 160 and into gap 129.

In some examples, drain holes 169 are evenly distributed along the length of petal peripheral-edge stiffener 160. The size of drain holes 169 is sufficient for the fuel to go through drain holes 169 without compromising the structural integrity of petal peripheral-edge stiffener 160.

Referring generally to FIG. 1 and particularly to, e.g., FIG. 2A-2C for illustrative purposes only and not by way of limitation, the following portion of this paragraph delineates example 27 of the subject matter, disclosed herein. According to example 27, which encompasses any one of examples 1 to 26, above, reusable launch vehicle 107 comprises fuel tank 100 and propulsion unit 108, fluidically coupled to fuel tank 100.

Baffle 120 of fuel tank 100 controls the fuel distribution inside fuel tank 100 during various operations of reusable launch vehicle 107. More specifically, baffle 120 is configured to enable the fuel to flow into a portion of fuel tank 100 between baffle 120 and sump 110 as, for example, is schematically shown in FIG. 2A. Furthermore, baffle 120 prevents a rapid escape of the fuel from this portion of fuel tank 100, e.g., when is subjected to acceleration (e.g., when the reusable launch vehicle decelerates during landing) as, for example, is schematically shown in FIG. 2B. As such, the fuel remains in this portion of fuel tank 100 and can be dumped from fuel tank 100 through dump tube 118 as, for example, is schematically shown in FIG. 2C.

In some examples, interior wall 105 of fuel tank 100 is formed from a composite material, which complicates the attachment of various components to interior wall 105. For example, various conventional attachment techniques (e.g., welding) are not suitable for composite materials. In more specific examples, baffle 120 is supported by sump 110, instead of being supported by interior wall 105.

Figure 8:
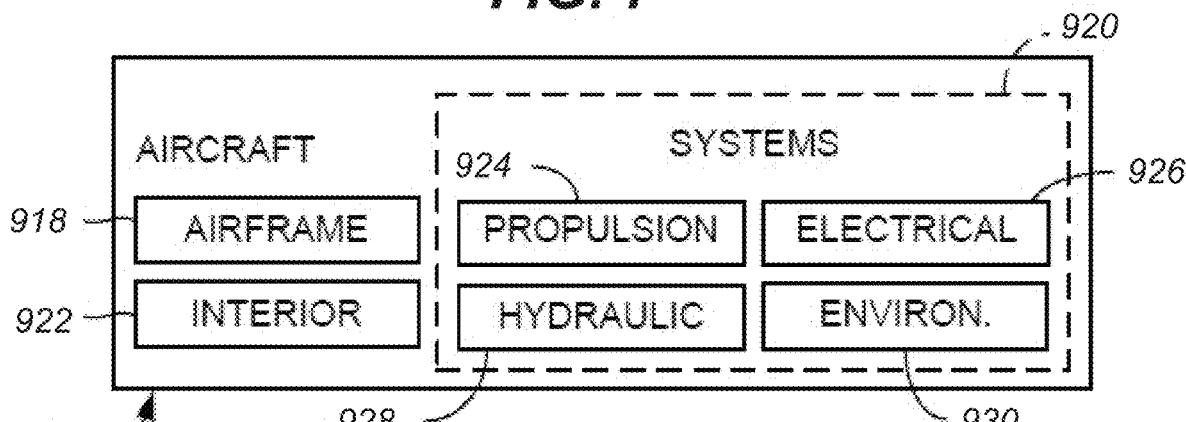
FIG. 8 is a schematic illustration of an aircraft.

Examples of the subject matter, disclosed herein may be described in the context of aircraft manufacturing and service method 900 as shown in FIG. 7 and aircraft 902 as shown in FIG. 8. During pre-production, method 900 may include specification and design (block 904) of aircraft 902 and material procurement (shown as block 906). During production, component and subassembly manufacturing (shown as block 908) and system integration (shown as block 910) of aircraft 902 may take place. Thereafter, aircraft 902 may go through certification and delivery (shown as block 912) to be placed in service (shown as block 914). While in service, aircraft 902 may be scheduled for routine maintenance and service (shown as block 916). Routine maintenance and service may include modification, reconfiguration, refurbishment, etc. of one or more systems of aircraft 902.

Each of the processes of method 900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, aircraft 902 produced by method 900 may include airframe 918 with a plurality of high-level systems 920 and interior 922. Examples of high-level systems 920 include one or more of propulsion system 924, electrical system 926, hydraulic system 928, and environmental system 930. Any number of other systems may be included. Although an aerospace example is shown, the principles disclosed herein may be applied to other industries, such as the automotive industry. Accordingly, in addition to aircraft 902, the principles disclosed herein may apply to other vehicles, e.g., land vehicles, marine vehicles, space vehicles, etc.

Apparatus(es) and method(s) shown or described herein may be employed during any one or more of the stages of method 900. For example, components or subassemblies corresponding to component and subassembly manufacturing (block 908) may be fabricated or manufactured in a manner similar to components or subassemblies produced while aircraft 902 is in service (block 914). Also, one or more examples of the apparatus(es), method(s), or combination thereof may be utilized during production stages, illustrated by block 908 and block 910, for example, by substantially expediting assembly of or reducing the cost of aircraft 902. Similarly, one or more examples of the apparatus or method realizations, or a combination thereof, may be utilized, for example and without limitation, while aircraft 902 is in service (block 914) and/or during maintenance and service (block 916).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus (es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A fuel tank, comprising:
   an interior wall;
   a sump; and
   a baffle, comprising:
   a center fitting;
   a full-length containment petal, comprising a full-length side edge, extending radially outward from the center fitting;
   a partial-length containment petal, comprising a partial-length side edge, extending radially outward from the center fitting; and
   a dump tube, connected to the sump,
   wherein:
   the full-length side edge of the full-length containment petal is longer than the partial-length side edge of the partial-length containment petal, and
   all of the partial-length side edge of the partial-length containment petal is attached to a linear portion of the full-length side edge of the full-length containment petal.

2. The fuel tank according to claim 1, wherein the baffle further comprises a center-fitting support strut, connecting the center fitting to the sump.

3. The fuel tank according to claim 1, wherein the baffle further comprises a petal support strut, connecting at least one of the full-length containment petal or the partial-length containment petal to the sump.

4. The fuel tank according to claim 3, wherein the petal support strut is connected to at least one of the full-length side edge of the full-length containment petal or the partial-length side edge of the partial-length containment petal.

5. The fuel tank according to claim 4, wherein:
   the baffle further comprises a petal side-edge stiffener, attached to at least one of the full-length side edge of the full-length containment petal or the partial-length side edge of the partial-length containment petal, and the petal support strut is attached to the petal side-edge stiffener.

6. The fuel tank according to claim 3, wherein the petal support strut is connected to both the full-length containment petal and the partial-length containment petal.

7. The fuel tank according to claim 6, wherein the petal support strut is connected to both the full-length side edge of the full-length containment petal and the partial-length side edge of the partial-length containment petal.

8. The fuel tank according to claim 7, wherein:
the baffle further comprises a petal side-edge stiffener,
the petal side-edge stiffener attaches the full-length side edge of the full-length containment petal to the partial-length side edge of the partial-length containment petal, and
the petal side-edge stiffener is connected to the petal support strut.

9. The fuel tank according to claim 1, wherein the baffle further comprises a petal side-edge stiffener, attached to the center fitting and to at least one of the full-length side edge of the full-length containment petal or the partial-length side edge of the partial-length containment petal.

10. The fuel tank according to claim 1, wherein the baffle further comprises a petal side-edge stiffener, attached to the center fitting and to both the full-length side edge of the full-length containment petal and the partial-length side edge of the partial-length containment petal.

11. The fuel tank according to claim 1, wherein:
the full-length containment petal is sealed against the interior wall; and
the partial-length containment petal is spaced away from the interior wall, forming a gap between the partial-length containment petal and the interior wall.

12. The fuel tank according to claim 11, further comprising a flexible seal that seals the full-length containment petal against the interior wall.

13. The fuel tank according to claim 11, wherein:
the dump tube comprises a dump-tube opening, and the gap and the dump-tube opening are located on opposite sides of the center fitting.

14. The fuel tank according to claim 1, further comprising a slosh baffle, attached to the baffle such that the full-length containment petal and the partial-length containment petal are located between the slosh baffle and the sump.

15. The fuel tank according to claim 14, further comprising a slosh-baffle support that attaches the slosh baffle to at least one of the full-length containment petal or the partial-length containment petal.

16. The fuel tank according to claim 15, wherein:
the baffle further comprises a petal side-edge stiffener, attached to at least one of the full-length side edge of the full-length containment petal or the partial-length side edge of the partial-length containment petal, and
the slosh-baffle support is attached to the petal side-edge stiffener.

17. The fuel tank according to claim 14, further comprising a slosh-baffle support that attaches the slosh baffle to both the full-length containment petal and the partial-length containment petal.

18. The fuel tank according to claim 17, wherein:
the baffle further comprises a petal side-edge stiffener, attached to both the full-length side edge of the full-length containment petal and the partial-length side edge of the partial-length containment petal, and
the slosh-baffle support is attached to the petal side-edge stiffener.

19. The fuel tank according to claim 1, wherein:
the center fitting comprises a first side, facing away from the sump, and a second side, facing toward the sump, and
each of the full-length containment petal and the partial-length containment petal forms an angle from 5° to 15° with the first side of the center fitting.

20. A reusable launch vehicle, comprising:
the fuel tank according to claim 1; and
a propulsion unit, fluidically coupled to the fuel tank.

* * * * *